(12) United States Patent
Harata

(10) Patent No.: US 6,501,709 B1
(45) Date of Patent: Dec. 31, 2002

(54) READ ERROR REDUCTION SYSTEM FOR A DISK PLAYER

(75) Inventor: Tsuyoshi Harata, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 0 days.

(21) Appl. No.: 09/858,473

(22) Filed: May 17, 2001

(30) Foreign Application Priority Data

May 17, 2001 (JP) ........................................ 2000-144842

(51) Int. Cl.⁷ ................................................ G11B 7/00
(52) U.S. Cl. .................. 369/30.16; 369/30.1; 369/44.28
(58) Field of Search ........................... 369/30.16, 30.15, 369/30.1, 44.28; 360/78.04, 78.05

(56) References Cited

U.S. PATENT DOCUMENTS

| | | | | |
|---|---|---|---|---|
| 5,216,650 A | * | 6/1993 | Noguchi | 369/44.28 |
| 5,442,604 A | * | 8/1995 | Osada | 369/44.28 X |
| 5,577,009 A | * | 11/1996 | Takamine | 369/44.28 X |

* cited by examiner

*Primary Examiner*—Aristotelis M. Psitos
(74) *Attorney, Agent, or Firm*—Birch, Stewart, Kolasch & Birch, LLP

(57) ABSTRACT

The disk player is capable of preventing a shift of an object lens in an optical pickup and a poor action caused by the shift. In the disk player, a first servo mechanism drives a motor, which moves an optical pickup in a radial direction of a disk. A second servo mechanism moves an object lens in a radial direction in the optical pickup so as to trace tracks of the disk. A control unit controls the first and second servo mechanisms so as to move the optical pickup from a current track to an object track. The control unit moves the optical pickup to the object track by the steps of: driving the motor without driving the second servo mechanism so as to move the optical pickup to a track near the object track; driving the second servo mechanism after the optical pickup reaches near the object track; stopping the second servo mechanism; and driving the first servo mechanism and the second servo mechanism after the laps of a prescribed time so as to move the optical pickup to the object track.

8 Claims, 4 Drawing Sheets

READ ERROR REDUCTION SYSTEM FOR A DISK PLAYER

BACKGROUND OF THE INVENTION

The present invention relates to a disk player for reproducing date recorded on an optical disk.

Many types of optical disks, e.g., CD, CD-ROM, CD-R, CD-RW, DVD-ROM, are employed to record data. Disk players having optical pickups have been used to read the data recorded on the optical disks.

The disk player includes a servo mechanism for driving a motor, which moves the optical pickup, and another servo mechanism for making the optical pickup trace tracks of the optical disk. The disk player controls the servo mechanisms to read data from the optical disk.

Action of the optical pickup of the conventional disk player will be explained.

To read assigned data, the optical pickup must be moved from a current track to an object track, in which the assigned date is recorded.

To move the optical pickup to the object track, the disk player calculate number of tracks between the current track and the object track, then the optical pickup is moved by two manners, which are selected on the basis of the number of the tracks there between. If the number of the tracks is less than a prescribed number, the pickup is moved by a manner called "short jump"; if the number of the tracks is equal to the prescribed number or more, the pickup is moved by a manner called "long jump".

In the manner of "short jump", the pickup is moved to trace the tracks with counting number of tracks until reaching the object track.

On the other hand, the manner of "long jump" is employed in the case that the number of the tracks between the current track and the object track is equal to the prescribe number or more. Namely, it takes a long time, by the manner of "short jump", to move the optical pickup to the object track. In the manner of "long jump", revolution number of the motor is counted without counting the number of the tracks while the optical pickup is moved. A distance to the object track is calculated on the basis of the revolution number of the motor, so that the optical pickup can be moved to the object track.

Moving accuracy of the long jump is low. To correctly move the optical pickup, the optical pickup is firstly move to a track near the object track by the long jump, then the optical pickup is further moved by the short jump, so that the optical pickup can be correctly moved to the object track.

FIGS. 4 and 5 show relationships between the optical pickup and an object lens of the optical pickup.

In FIG. 4, the optical pickup 10 has been moved to the track near the object track by the long jump. When the optical pickup 10 reaches the track 11 near the object track by the long jump, the tracking servo mechanism (not shown) drives the object lens 12 to lock the track 11.

When the object lens 12 locks the track 11 by the servo mechanism, reading track can be executed from the track 11. The optical pickup 10 is further moved from the track 11 to the object track by the short jump. While the short jump, the optical pickup 10 traces the tracks with driving the both servo mechanisms.

Revolutional speed of the motor during the long jump is faster than that of the motor during ordinary reproduction, so that the optical pickup 10 is moved faster during the long jump. By the fast motion, even if the long jump is finished, the optical pickup 10 cannot be stopped at a position, at which the object lens 12 locks the track 11, by inertia. Namely, the position of the optical pickup 10 is sometimes slightly shifted in the moving direction thereof as shown in FIG. 5.

If the optical pickup 10 is not completely stopped after the long jump and is shifted as described above, the object lens 12, which has locked the track 11, is shifted in the optical pickup 10. Since the object lens 12 can be moved in focusing and tracking directions, the shift of the object lens 12 occurs in the optical pickup 10.

After the long jump is finished, if the optical pickup 10 reads the track in the state of shifting the object lens 12, difference between clock signals and reproduced signals are increased and level of tracking error signals are made lower, so that the track cannot be correctly read and the reading action is stopped.

SUMMARY OF THE INVENTION

The disk player of the present invention is invented to solve the problems of the conventional disk player.

An object of the present invention is to provide a disk player capable of preventing a shift of an object lens in an optical pickup, which occurs after the optical pickup is moved, and a poor action caused by the shift.

Namely, the disk player of the present invention comprises:
  a first servo mechanism for driving a motor, which moves an optical pickup in a radial direction of a disk;
  a second servo mechanism for moving an object lens in a radial direction in the optical pickup so as to trace tracks of the disk; and
  a control unit controlling the first servo mechanism and the second servo mechanism so as to make the optical pickup jump over a plurality of the tracks to move the optical pickup from a current track to an object track,
  wherein the control unit moves the optical pickup from the current track to the object track by the steps of:
    driving the motor without driving the second servo mechanism so as to move the optical pickup to a track near the object track;
    driving the second servo mechanism after the optical pickup reaches near the object track;
    stopping the second servo mechanism; and
    driving the first servo mechanism and the second servo mechanism after the laps of a prescribed time so as to move the optical pickup to the object track.

In the disk player of the present invention, the second servo mechanism is once driven after the optical pickup reaches near the object track, then the second servo mechanism is immediately stopped. The object lens locks the track while the second servo mechanism is firstly driven. By immediately stopping the second servo mechanism, the shift of the optical pickup caused by the inertia is braked. And, the object lens can be returned to a center of the optical pickup while the second servo mechanism is stopped. Further, the shift of the optical pickup caused by the inertia is stopped while the second servo mechanism is stopped. Therefore, the object lens is not shifted when the second servo mechanism is driven again, so that the tracks can be correctly read and poor action, e.g., read error, can be prevented after the optical pickup reaches the object track.

BRIEF DESCRIPTION OF THE DRAWINGS

An embodiment of the present invention will now be described by way of an example and with reference to the accompanying drawings, in which.

DETAILED DESCRIPTION OF THE PREFERRED EMBODIMENT

A preferred embodiment of the present invention will now be described in detail with reference to the accompanying drawings.

Figure 1:
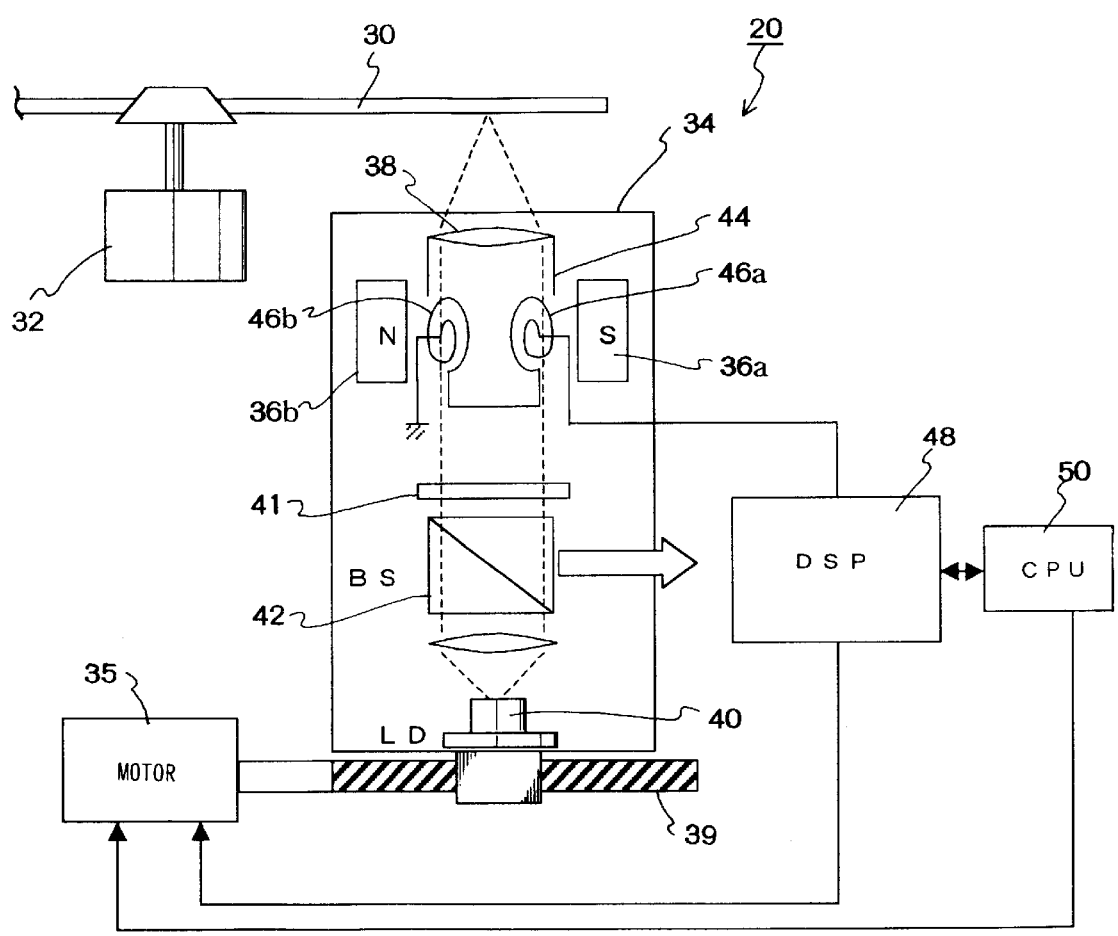
FIG. 1 is a block diagram of the disk player of the embodiment of the present invention.

Firstly, a structure of the disk player will be explained with reference to the block diagram of FIG. 1.

The disk player 20 reads data recorded on an optical disk 30, e.g., CD-ROM, CD-R, CD-RW, DVD-ROM.

The disk 30 is attached to and rotated by a spindle motor 32 so as to read the data thereon.

The data are spirally recorded on a surface of the disk 30. The data and the tracks are read by an optical pickup 34.

The optical pickup 34 is moved, by a motor 35, on a moving axis 39, in a radial direction of the disk 30. With action, the optical pickup 34 traces and reads the tracks on the disk 30.

The optical pickup 34 includes: a laser diode 40 for irradiating laser; an object lens 38 focusing the laser to a track; an actuator 44; a ¼ wave plate 41; and a beam splitter 42 for splitting a light reflected on a surface of the disk 30.

The actuator 44 supports the object lens 38. and allows the object lens 38 to move in the focusing direction and the radial direction of the disk 30.

Tracking coils 46a and 46b are respectively provided on the both sides of the actuator 44. The tracking coils 46a and 46b are mutually connected. Magnetic flux of the tracking coils 46a and 46b are headed toward the radial direction of the disk 30. Permanent magnets 36a and 36b are respectively provided on outer sides of the tracking coils 46a and 46b. With this structure, the object lens 34 is moved, by electric current passing through the tracking coils 46a and 46b, in the optical pickup 34 in the radial direction of the disk 30.

The reflected light, which is reflected on the surface of the disk 30, is split by the beam splitter 42 and inputted to a servo digital signal processor (DSP) 48 via a photo detector (not shown).

The DSP 48 controls servo mechanisms on the basis of tracking error signals and focusing error signals, which are inputted by the optical pickup 34. Thus, the DSP 48 includes a phase compensation circuit, driver circuits, etc.

A first servo mechanism includes the motor 35, the DSP 48, etc. The first servo mechanism and a second servo mechanism move the optical pickup 34 in the radial direction of the disk 30.

The second servo mechanism includes the DSP 48, the optical pickup 34, etc. The second servo mechanism is provided so as to securely trace the curved tracks on the disk 30. To read the curved track, the object lens 38 of the optical pickup 34 can be moved in the redial direction of the disk 30 so as to follow the curved track.

A control unit (CPU) 50 controls action of the whole DSP 48. When the CPU 50 does not execute servo control, the CPU 50 drives the motor 35 without controlling the DSP 48.

Figure 2:
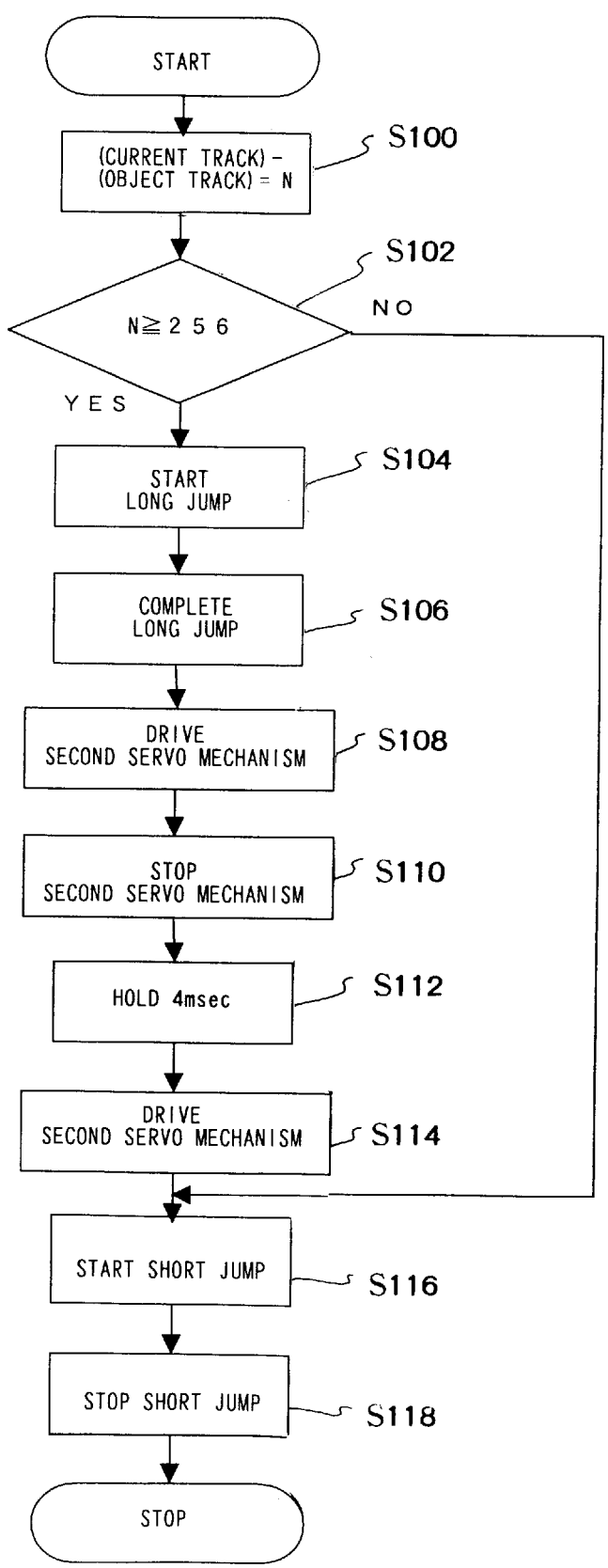
FIG. 2 is a flow chart of control steps for moving an optical pickup to an object track.

The action of moving the optical pickup 34 to an object track and reading the object track will be explained with reference to FIGS. 2 and 3.

In a step S100, number "N" of the tracks between a current track, which is now corresponded to the optical pickup 34, and the object track, from which data are reproduced by the optical pickup 34, is calculated by the CPU 50. Namely, the optical pickup 34 must jump the number of the tracks.

In a step S102, the number "N" of the tracks calculated by the CPU 50 is checked. Namely, the CPU 50 judges if the optical pickup 34 should be moved by the long jump or the short jump.

As described in BACKGROUND OF THE INVENTION, the number "N" is less than a prescribed number, e.g., 256, the pickup 34 traces the tracks with counting number of the tracks until reaching the object track. Namely, the shot jump is executed by driving the first servo mechanism and the second servo mechanism.

On the other hand, if the number "N" of the tracks is equal to the prescribe number or more, the optical pickup 34 is moved by the long jump. In this case, the CPU 50 directly detects revolution number of the motor 35 without using the DSP 48. A distance to the object track is calculated on the basis of the revolution number of the motor 35, so that the optical pickup 34 can be moved to the object track.

In the present embodiment, if the number "N" of the track is equal to 256 or more (N≧256), the optical pickup 34 is firstly moved by the long jump, then moved by the short jump. Therefore, the action of the disk player goes to a step S104. On the other hand, if the number "N" of the track is less than 256 (N<256), the optical pickup 34 is moved by the short jump. Therefore, the action of the disk player goes to a step S116.

At, the step S104, the optical pickup 34 is moved by the long jump, but the moving accuracy of the long jump is low. Thus, the optical pickup 34 is moved to a track near the object track by the long jump, then the optical pickup 34, which has been moved near the object track, is correctly moved, by the short jump, to the object track.

At the step S104, the CPU 50 directly drives the motor 3S without using the DSP 48. The CPU 50 calculates the revolution number of the motor 35 for moving the optical pickup 34 to the object track. While the long jump, the CPU 50 measures the revolution number of the motor 35, by measuring means (not shown), to move the optical pickup 34 to the object track. The second servo mechanism is not driven during the long jump, and the number of the track is not detected.

At a step S106, the CPU 50 stops the motor 35 when the optical pickup 34 reaches near the object track. The moving distance of the optical pickup 34 is measured on the basis of the revolution number of the motor 35. The long jump is finished at the step S106.

At a step S108, the second servo mechanism is driven (turned on). By driving the second servo mechanism, the object lens 38 tries to lock the track near the object track.

Then, the disk player immediately goes to a step S110. Namely, the second servo mechanism is immediately stopped (turned off).

Time length between the steps S108 and S110 is very short. If the second servo mechanism is driven and immediately stopped, the second servo mechanism is stopped before the track near the object track is locked.

By, driving and stopping the second servo mechanism after completing the long jump, the object lens 38 cannot lock the track near the object track, but the object lens 38 is braked and stopped at a position, at which the long jump is completed.

At a step S112, the second servo mechanism, which has just stopped, holds or waits a prescribed time. In the present embodiment, the holding time is 4 msec., but it is not limited to 4 msec.

While the second servo mechanism is stopped, no voltage for moving the object lens 38 in the radial direction of the disk 30 is inputted to the) tracking coils 46a and 46b. But standard voltage is inputted to the tracking coils 46a and 46b, so that the object lens 38 is located at a center of the optical pickup 34. Namely, if the second servo mechanism is stopped, the object lens 38 is automatically moved to the center of the optical pickup 34.

The second servo mechanism holds the prescribed time after driving and stopping the second servo mechanism. Then, the second servo mechanism is drive again. With this action, the object lens 38 can be returned to the center of the pickup 34 (see an arrow "A" shown in FIG. 3), so that the shift of the object lens 38 can be prevented.

While the second servo mechanism is stopped for 4 msec., the optical pickup 34, which has shifted by inertia, is also stopped by the braking action of driving and stopping the second servo mechanism. Therefore, the object lens 38 is not shifted from the center of the optical pickup 34.

After the laps of 4 msec., the second servo mechanism is driven again at a step S114. With this action, the track can be read by the optical pickup 34, in which the object lens 38 is located at the center.

Figure 3A:
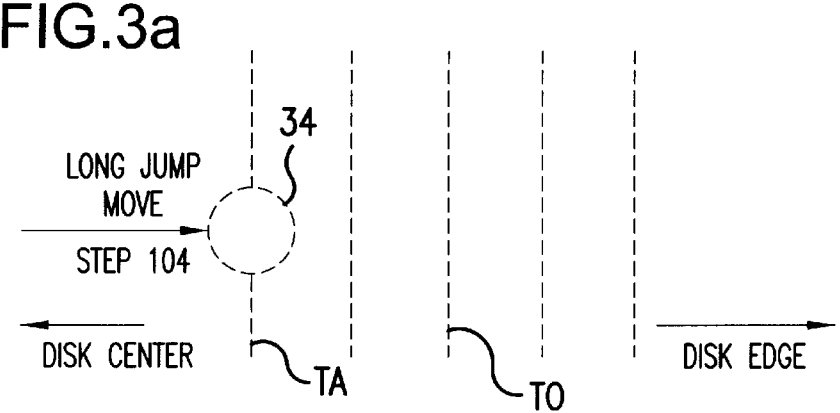
FIG. 3 is an explanation view, in which an object lens returns to a center of the optical pickup.
Figure 3B:
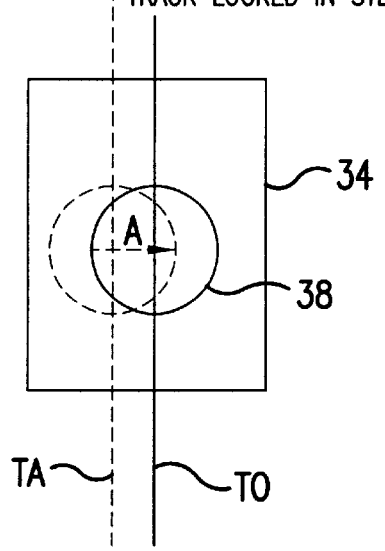
Figure 3C:
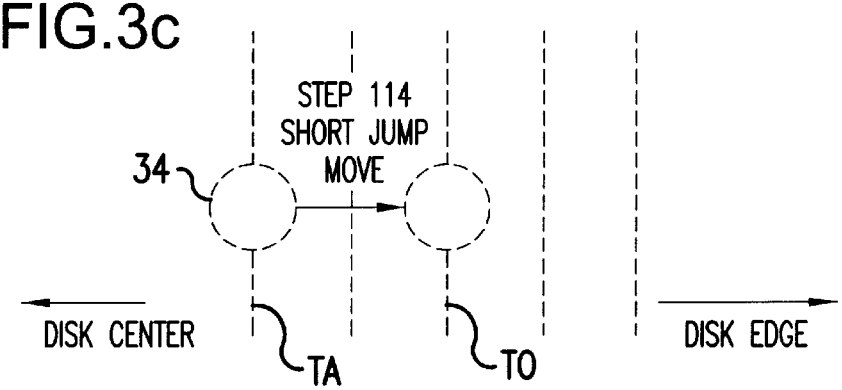
Figure 4:
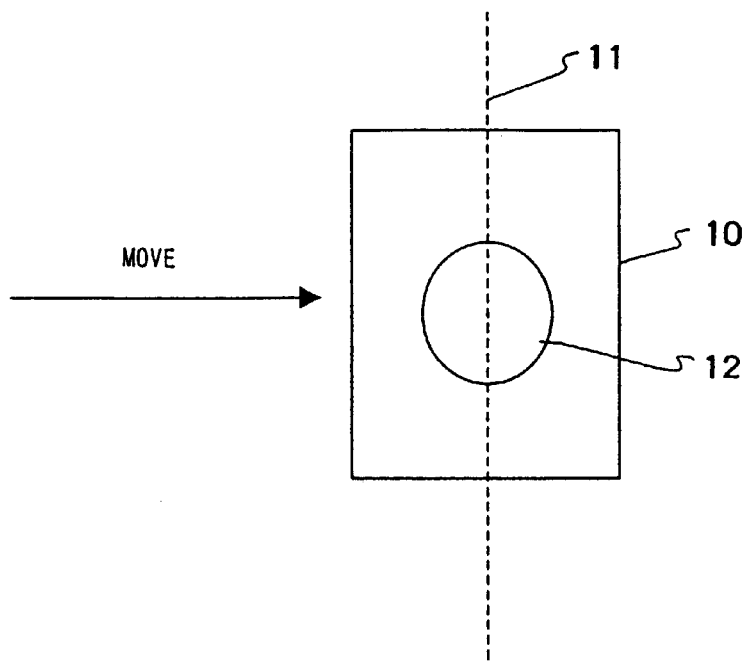
FIG. 4 is an explanation view showing the relationship between the optical pickup and the object lens immediately after the long jump is finished.
Figure 5:
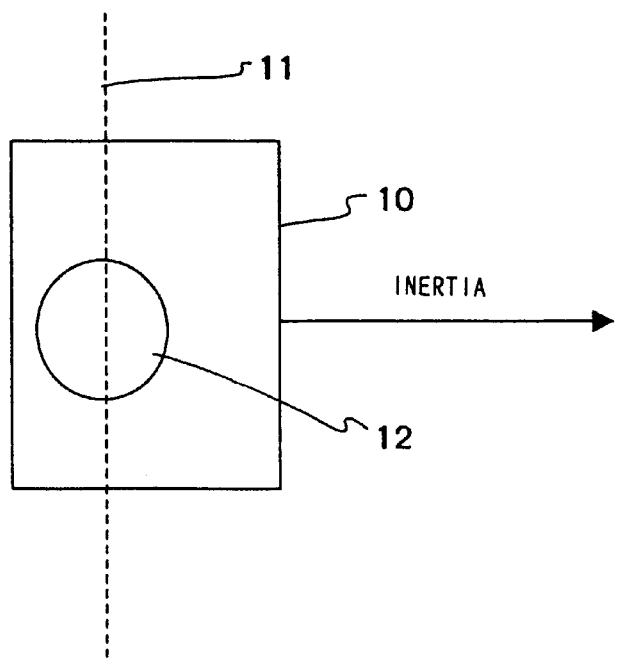
FIG. 5 is an explanation view showing the shift of the object lens, which is occurred after the long jump is finished and the object lens locks the track.

Note that, as shown in FIG. 3, a track 61, which is locked by the object lens 38 when the second servo mechanism is driven at the step S114, is different from a track 62, which is locked when the second servo mechanism is driven, at the step S108, after completing the long jump.

The track 62, which is locked when the long jump is completed, is different from the track 61, which is actually read and traced, because the moving accuracy of the long jump is low. But the short jump is executed after the long jump, so the optical pickup 34 can be correctly moved to the object track.

After the second servo mechanism is driven again, the action goes to a step S116 so as to execute the short jump. As described in BACKGROUND OF THE INVENTION, the locked track is read and traced. The first and the second servo mechanisms are driven until the optical pickup 34 correctly reaches the object track.

When the optical pickup 34 correctly reaches the object track, the short jump is completed at a step S118, and the action of moving the optical pickup 34 to the object track is completed.

Control programs for above described action are written in firmware, which control the whole system of the disk player.

The firmware is previously stored in a nonvolatile memory, e.g., flush memory.

Note that, error generation rate of the conventional disk player, in which the short jump is executed with driving the servo mechanism immediately after the long jump, is about 7%.

On the other hand, in the disk player of the present embodiment, the error generation rate, after completing the movement of the optical pickup, is about 0.87%. The rate can be highly improved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk player, comprising
a first servo mechanism for driving a motor, which moves an optical pickup in a radial direction of a disk;
a second servo mechanism for moving an object lens in a radial direction in the optical pickup wherein the second servo mechanism is capable of tracing tracks of the disk; and
a control unit controlling the first servo mechanism and the second servo mechanism so as to make the optical pickup jump over a plurality of the tracks to move the optical pickup from a current track to an object track,
wherein the control unit moves the optical pickup from the current track to the object track by the steps of:
driving the motor without driving the second servo mechanism so as to move the optical pickup to a position estimated to the position of the object track;
driving the second servo mechanism after the optical pickup has reached the position estimated to the position of the object track;
stopping the second servo mechanism after a first prescribed period of time in order to allow the object lens to move to a center of the optical pickup; and
driving the first servo mechanism and the second servo mechanism after the lapse of a second prescribed period of time so as to move the optical pickup to the correct position of the object track.

2. The disk player according to claim 1, wherein the first servo mechanism includes a motor and a digital signal processor, and the first servo mechanism and the second servo mechanism move the optical pickup in a radial direction of a disk.

3. The disk player according to claim 2, wherein the second servo mechanism includes a digital signal processor and the optical pickup.

4. A method of moving an optical pickup of a disk player having a first and a second servo mechanism and a control unit, comprising the steps of:
calculating a number of tracks between a current track and an object track to estimate the position of the object track;
driving the motor without driving the second servo mechanism so as to move the optical pickup to a position estimated to the position of the object track when the number of tracks is equal to or greater than a prescribed number;
driving the second servo mechanism after the optical pickup has reached the position estimated to be the position of the object track;

stopping the second servo mechanism after a first prescribed period of time in order to allow the object lens to move to a center of the optical pickup; and driving the first servomechanism and the second servo mechanism after the lapse of a second prescribed period of time so as to move the optical pickup to the object track.

5. The method of moving an optical pickup of a disk player according to claim 4, wherein the prescribed number is 256.

6. The method of moving an optical pickup of a disk player according to claim 4, wherein the second prescribed period of time is 4 msec.

7. The method of moving an optical pickup of a disk player according to claim 4, wherein the in stopping step the object lens is braked.

8. The method of moving an optical pickup of a disk player according to claim 7, wherein the object lens is automatically moved to a center of the optical pickup.

* * * * *